US008517839B2

(12) United States Patent  (10) Patent No.: US 8,517,839 B2
Murakawa et al.  (45) Date of Patent: Aug. 27, 2013

(54) STORAGE MEDIUM STORING SAVE CONTROLLING PROGRAM, GAME APPARATUS AND SAVE CONTROLLING METHOD

(75) Inventors: Teruki Murakawa, Kyoto (JP); Masahiro Kawano, Kyoto (JP); Kenta Tanaka, Kyoto (JP); Ken Kato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 19 days.

(21) Appl. No.: 13/239,575

(22) Filed: Sep. 22, 2011

(65) Prior Publication Data

US 2012/0077601 A1  Mar. 29, 2012

(30) Foreign Application Priority Data

Sep. 24, 2010  (JP) .................................. 2010-214040

(51) Int. Cl.
   *A63F 13/12*  (2006.01)
(52) U.S. Cl.
   USPC .................... 463/42; 463/37; 463/38; 463/39

(58) Field of Classification Search
   USPC ....................................................... 463/36–44
   See application file for complete search history.

(56) References Cited

U.S. PATENT DOCUMENTS 6,699,127 B1 *  3/2004  Lobb et al. ...................... 463/43

FOREIGN PATENT DOCUMENTS

JP  2001-157777  6/2001

* cited by examiner

*Primary Examiner* — Omkar Deodhar
(74) *Attorney, Agent, or Firm* — Nixon & Vanderhye P.C.

(57) ABSTRACT

An example game apparatus stores a state of a game during execution as execution state information in a memory, and stores a captured image of the game screen by bringing it into correspondence with the execution state information in the memory. Furthermore, during execution of the game, the captured image is displayed on a lower LCD while the game screen is displayed on an upper LCD. In a state that the game screen and the captured image are thus displayed, a selecting operation from a user is accepted. Then, by using the execution state information which is brought into correspondence with the captured image selected in response to a selecting operation, the state of the game is restored.

14 Claims, 15 Drawing Sheets

(A)

(B)

(DURING EXECUTION OF GAME WITHOUT NO GAME MARKER :
UPPER SCREEN ACTIVE/LOWER SCREEN INACTIVE)

(TOUCH OF LOWER SCREEN DURING EXECUTION OF GAME WITHOUT GAME MARKER→
UPPER SCREEN INACTIVE/LOWER SCREEN ACTIVE)

(DURING EXECUTION OF GAME WITH GAME MARKER :
UPPER SCREEN ACTIVE/LOWER SCREEN INACTIVE)

(TOUCH OF LOWER SCREEN DURING EXECUTION OF GAME WITH GAME MARKER→
UPPER SCREEN INACTIVE/LOWER SCREEN ACTIVE)

(B)

(EXAMPLE EMBODIMENT CAPABLE OF REMAKING GAME MARKER)

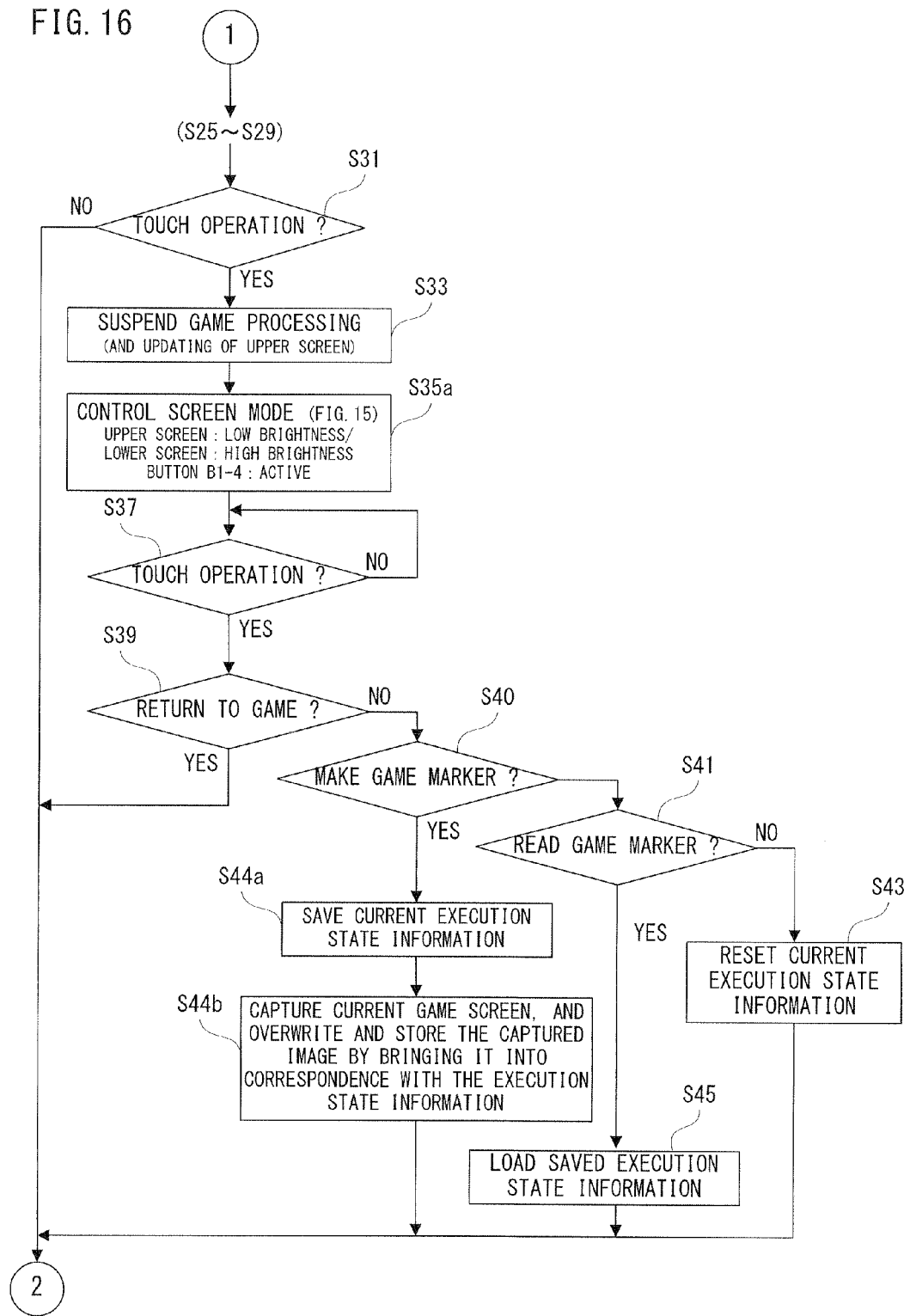

STORAGE MEDIUM STORING SAVE CONTROLLING PROGRAM, GAME APPARATUS AND SAVE CONTROLLING METHOD

CROSS REFERENCE OF RELATED APPLICATION

The disclosure of Japanese Patent Application No. 2010-214040 filed on Sep. 24, 2010 is incorporated herein by reference.

FIELD

The example embodiment relates to a storage medium storing a save controlling program, game apparatus, game system and save controlling method. More specifically, the present example embodiment relates to a storage medium storing a save controlling program, game apparatus, game system and save controlling method which stores execution state information of a game.

SUMMARY

Therefore, it is a primary object of the example embodiment to provide a novel storage medium storing a save controlling program, game apparatus, and game system and save controlling method.

Another object of the example embodiment is to provide a storage medium storing a save controlling program, game apparatus, game system and save controlling method which is able to easily determine which is more advantageous between a previously-saved state and a currently-saved state during progress of the game, and restore the state if the previously-saved state is more advantageous.

The example embodiment adopts following configurations in order to solve the aforementioned problem.

A first example embodiment is a storage medium storing a save controlling program to be executed by a computer of a game apparatus, the save controlling program causes the computer to function as: a saver which stores a state of a game during execution as execution state information in a memory, and stores a captured image of a game screen by bringing it into correspondence with the execution state information in the memory at a time; a captured image displayer which displays the captured image stored by the saver on a display surface with the game screen displayed on the display surface, during execution of the game; a selecting operation acceptor which accepts a selecting operation from a user in a state that the game screen and the captured image are displayed by the captured image displayer; and a state restorer which restores a state of the game by using the execution state information which is brought into correspondence with the captured image selected in response to the selecting operation.

In the first example embodiment, by execution of the save controlling program in the computer of the game apparatus, the computer functions as a saver, a captured image displayer, a selecting operation acceptor, and a state restorer.

The saver stores a state of a game during execution as execution state information in a memory, and stores a captured image of a game screen by bringing it into correspondence with the execution state information in the memory at a time. The captured image displayer displays the captured image stored by the saver on a display surface with the game screen displayed on the display surface, during execution of the game. The selecting operation acceptor accepts a selecting operation from a user in a state that the game screen and the captured image are displayed by the captured image displayer. The state restorer restores a state of the game by using the execution state information which is brought into correspondence with the captured image selected in response to the selecting operation.

According to the first example embodiment, during loading of the save data, the game screen during execution and the captured image at a time of execution of saving are simultaneously displayed, and therefore, it is possible to decide whether to load or not comparing the state during execution and the saved state. Thus, it is possible to prevent a more disadvantageous state than before loading due to erroneous loading from occurring.

A second example embodiment is a storage medium storing a save controlling program according to the first example embodiment, wherein the state restorer leaves the execution state information to render it reusable even after the state of the game is restored.

According to the second example embodiment, the saved execution state information (game marker data) is not erased even after loading, and thus, it is possible to restore the state of the game repeatedly.

A third example embodiment is a save controlling program according to the first example embodiment, wherein the save controlling program causes the computer to further function as a saving operation acceptor which accepts a save executing operation from the user in a state that the game screen and the captured image are displayed by the captured image displayer, and the saver stores the execution state information in response to the save executing operation.

In the third example embodiment, the computer further functions as a saving operation acceptor. The saving operation acceptor accepts a save executing operation from the user in a state that the game screen and the captured image are displayed by the captured image displayer, and the saver stores the execution state information in response to the accepted save executing operation.

According to the third example embodiment, it is possible to updatably save the execution state information and the captured image. Furthermore, the current game screen and the captured image which has already been saved are displayed, and therefore, it is possible to decide whether to save the current state in place of the already-saved state, comparing the already-saved state and the current state. Thus, if the current state is better than the already-saved state, the current state may be saved, resulting in high efficiency.

Here, while the execution state information has not been saved yet, displaying the captured image by the captured image displayer is not performed. Accordingly, a save executing operation from the user is accepted in a state that only the game screen is displayed, and the execution state information is stored in response to the save executing operation.

A fourth example embodiment is a storage medium storing a save controlling program according to the first example embodiment, wherein the save controlling program causes the computer to further function as a suspender which suspends the game, and the selecting operation acceptor is made active in a state that the game is suspended by the suspender.

In the fourth example embodiment, a selecting operation for loading the execution state information is performed after the game is suspended.

Here, the selecting operation acceptor is made inactive during progress of the game.

According to the fourth example embodiment, it is possible to calmly perform a selecting operation in a state that the game is suspended.

A fifth example embodiment is a storage medium storing a save controlling program according to the third example embodiment, wherein the save controlling program causes the computer to further function as a suspender which suspends the game, and the selecting operation acceptor and the saving operation acceptor are made active in a state that the game is suspended by the suspender.

In the fifth example embodiment, the saving operation for saving the execution state information and the selecting operation for loading the saved execution state information are accepted after the game is suspended.

Here, both of the selecting operation acceptor and the saving operation acceptor are made inactive while the game progresses.

According to the fifth example embodiment, it is possible to calmly perform the saving operation and the selecting operation in a state that the game is suspended.

A sixth example embodiment is a storage medium storing a save controlling program according to the first example embodiment, wherein the display surface includes a first display screen and a second display screen, and the game screen is displayed on the first display screen, and the captured image is displayed on the second display screen.

According to the sixth example embodiment, the first and the second display surfaces are respectively used for displaying the game screen and the captured image, and therefore, it is possible to easily compare them, resulting in high operability. Specifically, in a case of a game only using the first display screen, the second display screen is available, and thus, this can effectively be used for the captured image.

A seventh example embodiment is a storage medium storing a save controlling program according to the sixth example embodiment, wherein the second display screen is provided with a touch panel, and the selecting operation acceptor detects a touch operation on the captured image displayed on the second display screen by the touch panel, and accepts it as the selecting operation.

In the seventh example embodiment, on the second display screen, a touch panel is provided, and the captured image is selected on a touch operation on the second display screen.

According to the seventh example embodiment, a selection can be made with a touch operation on the captured image itself, and this makes it possible to perform an intuitive operation, resulting in high operability. Specifically, in a case of a game using only the first display screen with no touch panel, the second display screen with touch panel is available, and thus, this can effectively be used for detecting a touch on the captured image.

An eighth example embodiment is a storage medium storing a save controlling program according to the seventh example embodiment, wherein the save controlling program causes the computer to further function as a suspender which suspends the game when a touch operation on the second display screen is detected during execution of the game, and the selecting operation acceptor is made active in a state that the game is suspended by the suspender.

In the eighth example embodiment, when a touch operation on the second display screen is performed during execution of the game, the game is suspended, and a touch operation for selecting the captured image is accepted in this state.

Here, a touch operation for suspending the game may be replaced with a button operation. In this case, it is preferable that if a button which is not in use in the game is assigned a suspension function, it is possible to effectively use an unassigned button.

A ninth example embodiment is a storage medium storing a save controlling program according to the first example embodiment, wherein the save controlling program is a part of an emulator program causing the computer of the game apparatus to compatibly execute a game program for another game apparatus different in construction from the game apparatus, the memory includes a data-for-execution memory which stores data for execution to be utilized when the computer compatibly executes the game program by the emulator program, and a save memory which stores the execution state information, the saver includes an execution state memory controller which stores contents of the data-for-execution memory at a timing designated by the user as at least a part of the execution state information in the save memory regardless of progress of the game, and a captured image memory controller which stores the game screen at the designated timing as the captured image by bringing it into correspondence with the execution state information in the save memory.

In the ninth example embodiment, the save controlling program is a part of an emulator program, and causes the computer of the game apparatus to execute a game program for another game apparatus different in construction from the game apparatus. The memory includes data-for-execution memory and save memory, and in the data-for-execution memory, data for execution to be utilized when the computer compatibly executes the game program by the emulator program is stored, and in the save memory, the execution state information is stored.

The saver includes an execution state memory controller and a captured image memory controller, and the execution state memory controller stores contents of the data-for-execution memory at a timing designated by the user as at least a part of the execution state information in the save memory regardless of progress of the game. The captured image memory controller stores the game screen at the designated timing as a captured image by bringing it into correspondence with the execution state information in the save memory.

Here, the "execution state information of the game" mainly indicates contents of the data-for-execution memory while the "progress of the game" indicates how far the game progresses (how the game progresses), such as points, stages, positions of characters, for example. Accordingly, "regardless of the progress of the game" means that the function of saving the execution state information is regardless of (independent of) the function of saving the progress of the game.

Also, if there is information which does not change even if the computer compatibly executes the game program using the emulator program in the data-for-execution memory, this kind of information may be excluded from the object to be saved.

A tenth example embodiment is a storage medium storing a save controlling program according to the ninth example embodiment, wherein the data-for-execution memory includes a virtual state information memory for storing virtual state information indicating a virtual state of the other game apparatus realized as a result of compatible execution of the game program by the computer by using the emulator program, and the execution state memory controller stores contents of the virtual state information memory at the timing designated by the user as at least the execution state information in the save memory.

In the tenth example embodiment, the memory further includes a virtual state information memory, and in the virtual state information memory, virtual state information indicating a virtual state of the other game apparatus realized as a result of compatible execution of the game program by the computer by using the emulator program is stored. The execution state memory controller stores contents of the virtual state information memory at the timing designated by the user as at least the execution state information in the save memory.

Here, the virtual state information preferably includes information indicating states of the computer and other pieces of hardware (CPU, VRAM, I/O register, etc.) of the virtual other game apparatus.

Also, if there is information which does not change even if the computer compatibly executes the game program using the emulator program in the virtual state information memory, such kind of information may be excluded from the object to be saved.

Here, the emulator program may be for emulating and executing the game program itself (while emulating). In this case, the data-for-execution memory includes data for program execution memory for compatibly executing the game program by the computer by using the emulator program, and the execution state memory controller stores the contents of the data for program execution memory at a timing designated by the user as at least part of the execution state information in the save memory.

According to the ninth and tenth example embodiments, irrespective of the save function of the game program, the save function (save function of the virtual console) of the emulator program is implemented. This makes it possible to perform saving in the game which does not originally have a save function or at a point except for points where saving is originally possible. In addition, whether to load save data or not can be decided in comparison with a current state, and therefore, it is possible to make a situation better even little by little, and to advance the game which could not advance by a normal execution method.

An eleventh example embodiment is a game apparatus comprising: a saver which stores a state of a game during execution as execution state information in a memory, and stores a captured image of a game screen by bringing it into correspondence with the execution state information in the memory at a time; a captured image displayer which displays the captured image stored by the saver on a display surface with the game screen displayed on the display surface, during execution of the game; a selecting operation acceptor which accepts a selecting operation from a user in a state that the game screen and the captured image are displayed by the captured image displayer; and a state restorer which restores a state of the game by using the execution state information which is brought into correspondence with the captured image selected in response to the selecting operation.

A twelfth example embodiment is a saving method to be executed in the game apparatus, including: a saving step for storing a state of a game during execution as execution state information in a memory, and storing a captured image of a game screen by bringing it into correspondence with the execution state information in the memory at a time; a captured image displaying step for displaying the captured image stored by the saving step on a display surface with the game screen displayed on the display surface, during execution of the game; a selecting operation accepting step for accepting a selecting operation from a user in a state that the game screen and the captured image are displayed by the captured image displaying step; and a state restoring step for restoring a state of the game by using the execution state information which is brought into correspondence with the captured image selected in response to the selecting operation.

A thirteenth example embodiment is a game system comprising: a memory; a display surface; a saver which stores a state of a game during execution as execution state information in a memory, and stores a captured image of a game screen by bringing it into correspondence with the execution state information in the memory at a time; a captured image displayer which displays the captured image stored by the saver on a display surface with the game screen displayed on the display surface, during execution of the game; a selecting operation acceptor which accepts a selecting operation from a user in a state that the game screen and the captured image are displayed by the captured image displayer; and a state restorer which restores a state of the game by using the execution state information which is brought into correspondence with the captured image selected in response to the selecting operation.

In each of the eleventh to the thirteenth example embodiments, similar to the first example embodiment, it is possible to easily determine which is more advantageous, a previously-saved state or a currently-saved state during progress of the game, and restore the state if the previously-saved state is more advantageous.

According to the present example embodiment, it is possible to realize a storage medium storing a save controlling program, game apparatus, game system and save controlling method which is able to easily determine which is more advantageous, a previously-saved state or a currently-saved state during progress of the game, and restore the state if the previously-saved state is more advantageous.

The above described objects and other objects, features, aspects and advantages of the example embodiment will become more apparent from the following detailed description of the example embodiment when taken in conjunction with the accompanying drawings.

BRIEF DESCRIPTION OF THE DRAWINGS

FIG. 2(A) shows an example non-limiting top surface in a close state, FIG. 2(B) shows an example non-limiting left side surface in the close state, FIG. 2(C) shows an example non-limiting front surface in the close state, FIG. 2(D) shows an example non-limiting right side surface in the close state, FIG. 2(E) shows an example non-limiting back surface in the close state, FIG. 2(F) shows an example non-limiting bottom surface in the close state;

FIG. 6(A) shows an example non-limiting state that a parallax barrier is turned on (3D display), and FIG. 6(B) shows an example non-limiting state that the parallax barrier is turned off (2D display);

FIG. 12(A) shows an example non-limiting part of the memory map of a NAND flash memory, and FIG. 12(B) shows an example non-limiting part of the memory map of a main memory (work RAM);

FIG. 16 shows an example non-limiting flowchart showing a part of a flowchart showing an operation by a CPU in the second embodiment, corresponding to FIG. 14.

DETAILED DESCRIPTION OF NON-LIMITING EXAMPLE EMBODIMENTS

Figure 1:
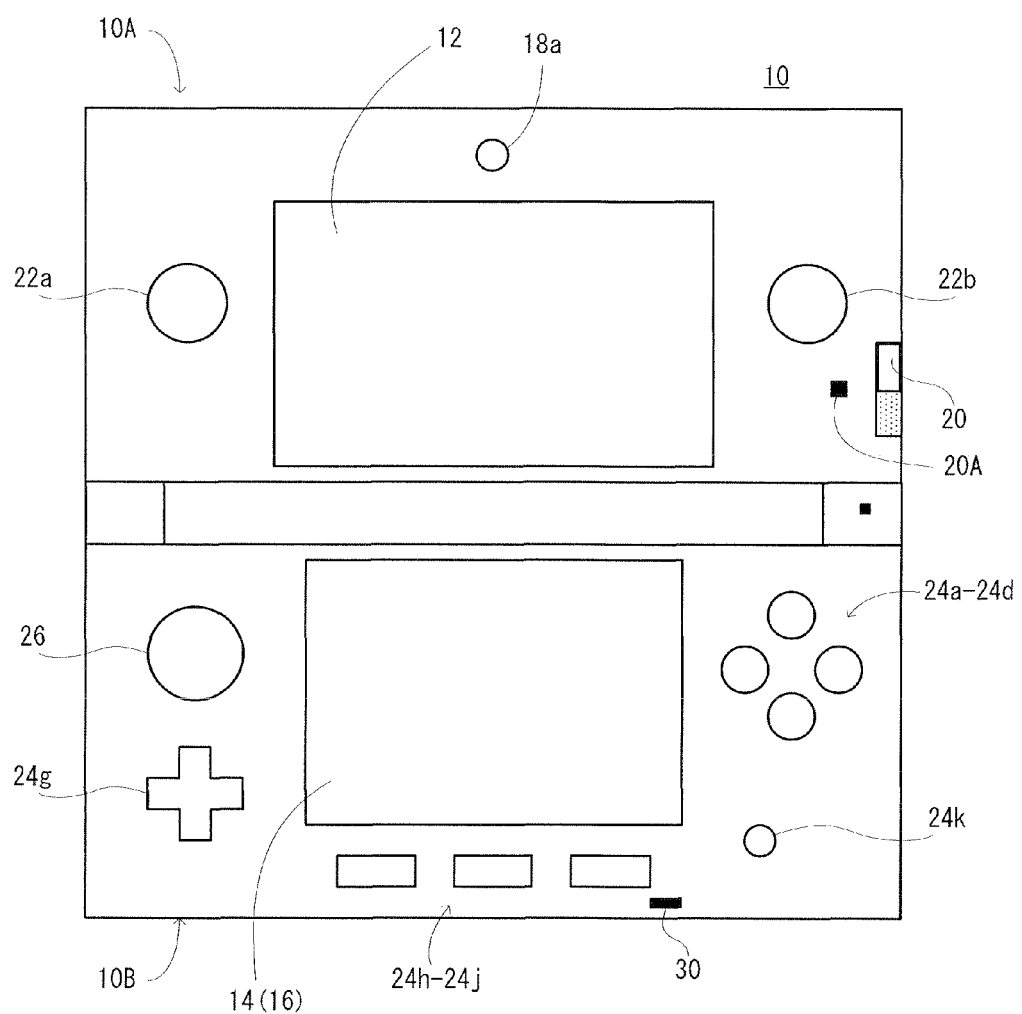
FIG. 1 shows an example (first embodiment) non-limiting front surface of a game apparatus in an open state.
Figure 2:
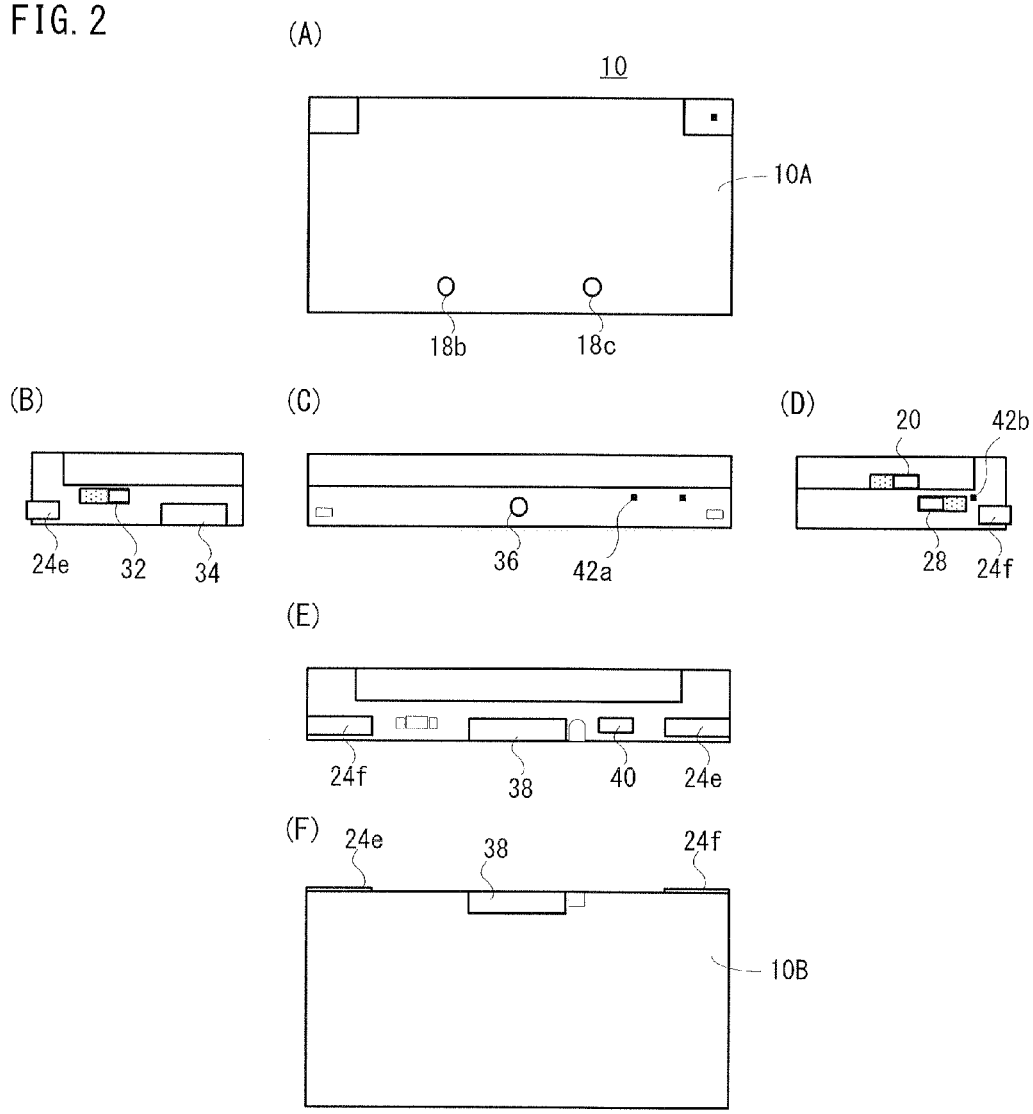
FIG. 2 shows an example non-limiting game apparatus.

FIG. 1 and FIG. 2 show an appearance of the game apparatus 10 being one example embodiment. The game apparatus 10 is a foldable game apparatus, FIG. 1 shows a front of the game apparatus 10 in an opened state, FIG. 2(A) to FIG. 2(F) respectively show a top surface, a left side surface, a front surface, a right side surface, a back surface and a bottom surface of the game apparatus 10 in a closed state.

The game apparatus 10 has an upper housing 10A and a lower housing 10B rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc. are provided. On a top surface of the lower housing 10B, a lower LCD 14 attached with touch panel 16, A, B, X, Y buttons 24a to 24d, a cross key (up, down, right and left button) 24g, home, select, start buttons 24h-24j, a power button 24k, an analog pad 26, and a microphone 30 are provided.

Furthermore, as shown in FIG. 2(A), on the top surface of the game apparatus 10 (underside of the upper housing 10A shown in FIG. 1), right and left outward cameras 18b and 18c compliant with 3D imaging are provided. Furthermore, as shown in FIG. 2(C), on the front surface of the game apparatus 10, a headphone terminal 36, a power lamp 42a, etc. are provided. Also, as shown in FIG. 2(B), FIG. 2(E) and FIG. 2(D), from the left side surface to the back surface of the game apparatus 10, an L button 24e is provided, and from the right side surface to the back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are further provided. The above-described 3D adjusting switch 20 is exposed from the right side surface. In addition, on the back surface of the game apparatus 10, an infrared ray emitting-receiving unit 40, etc. is further provided. Then, as shown in FIG. 2(E) and FIG. 2(F), from the back surface to a bottom surface, a game card slot 38 is provided.

Figure 6:
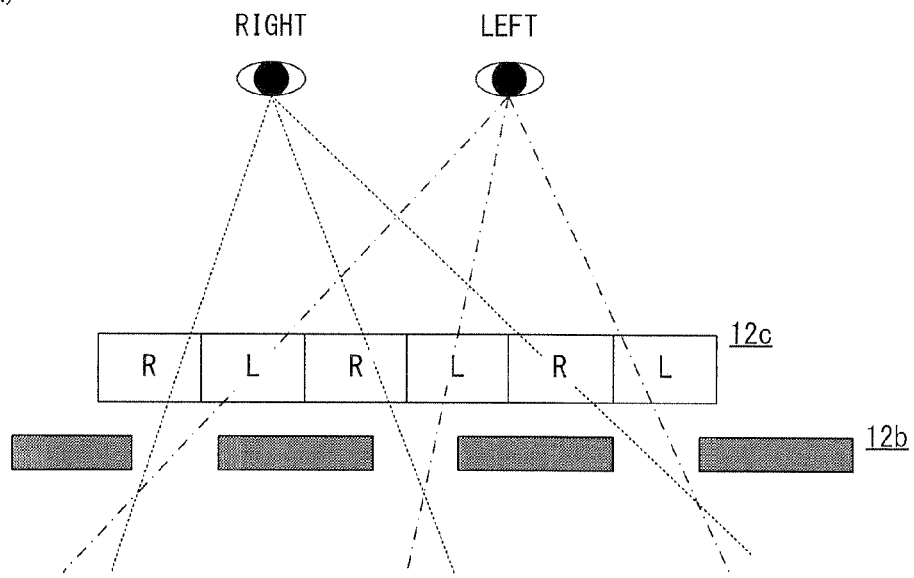
FIG. 6 shows an example non-limiting principle of 3D/2D displays according to a parallax barrier method.
Figure 6:
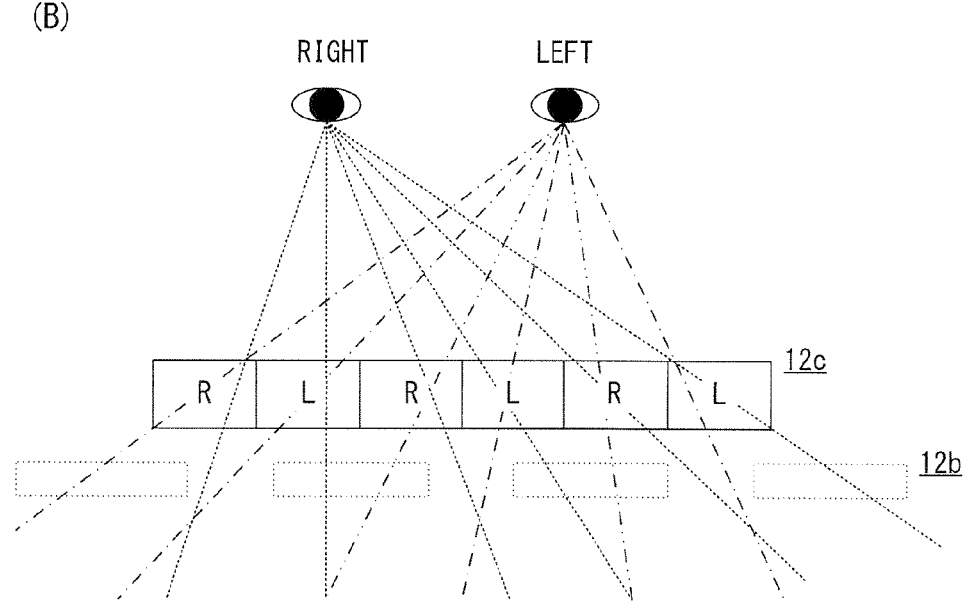

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereoscopic 3D systems may be adopted without being restricted to the parallax barrier system.

The inward camera 18a images a planar image (2D image) while the outward cameras 18b and 18c image stereoscopic images (3D image). A 2D or 3D image imaging a player can be used as an image input to a game program. In this case, the game program detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

Figure 3:
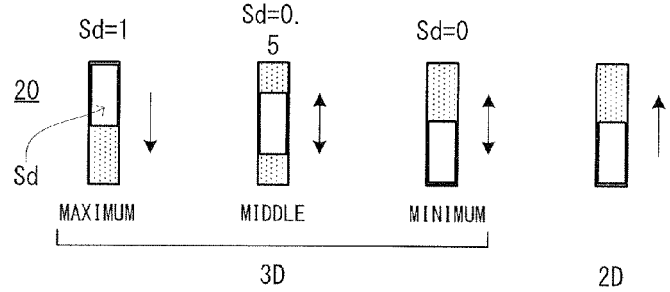
FIG. 3 shows an example non-limiting operation of a 3D adjusting switch.

The 3D adjusting switch 20 is a slide switch for manually switching, as to the display of the stereoscopic LCD 12, between the 3D display and the 2D display, and manually adjusting a three-dimensional effect in the 3D display as well, and operates as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved to the lower end.

Although the detailed description is omitted, such a change of the three-dimensional effect of the 3D display is implemented by changing the distance (distance-between cameras) between the right and left virtual cameras arranged within the virtual space. That is, according to an operation of the 3D adjusting switch 20, the distance-between cameras is adjusted. Then, the distance-between cameras undergoes an automatic adjustment by the game program as well as such a manual adjustment.

The 3D lamp 20A is a lamp showing a displaying condition of the stereoscopic LCD 12, and lights up in the 3D display and lights off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a to 24d, the cross key (button) 24g, the home, select, start buttons 24h-24j, or the analog pad 26 is used as a touch/button/pad input to the game program. The power button 24k is used for turning on or off the power of the game apparatus 10. The power lamp 42a lights up or off in conjunction with the power-on or the power-off of the power source.

The microphone 30 converts a speech voice by a user, an environmental sound, etc. into sound data. The sound data can be used as a sound input to the game program. In this case, the game program detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game voice, a microphone voice, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for saving a camera image, a microphone sound, etc., and the game card slot 38 is attached with a game card (not illustrated) storing the game program, etc. The infrared ray emitting-receiving unit 40 is utilized for infrared rays (IR) communications with other game apparatuses.

Figure 4:
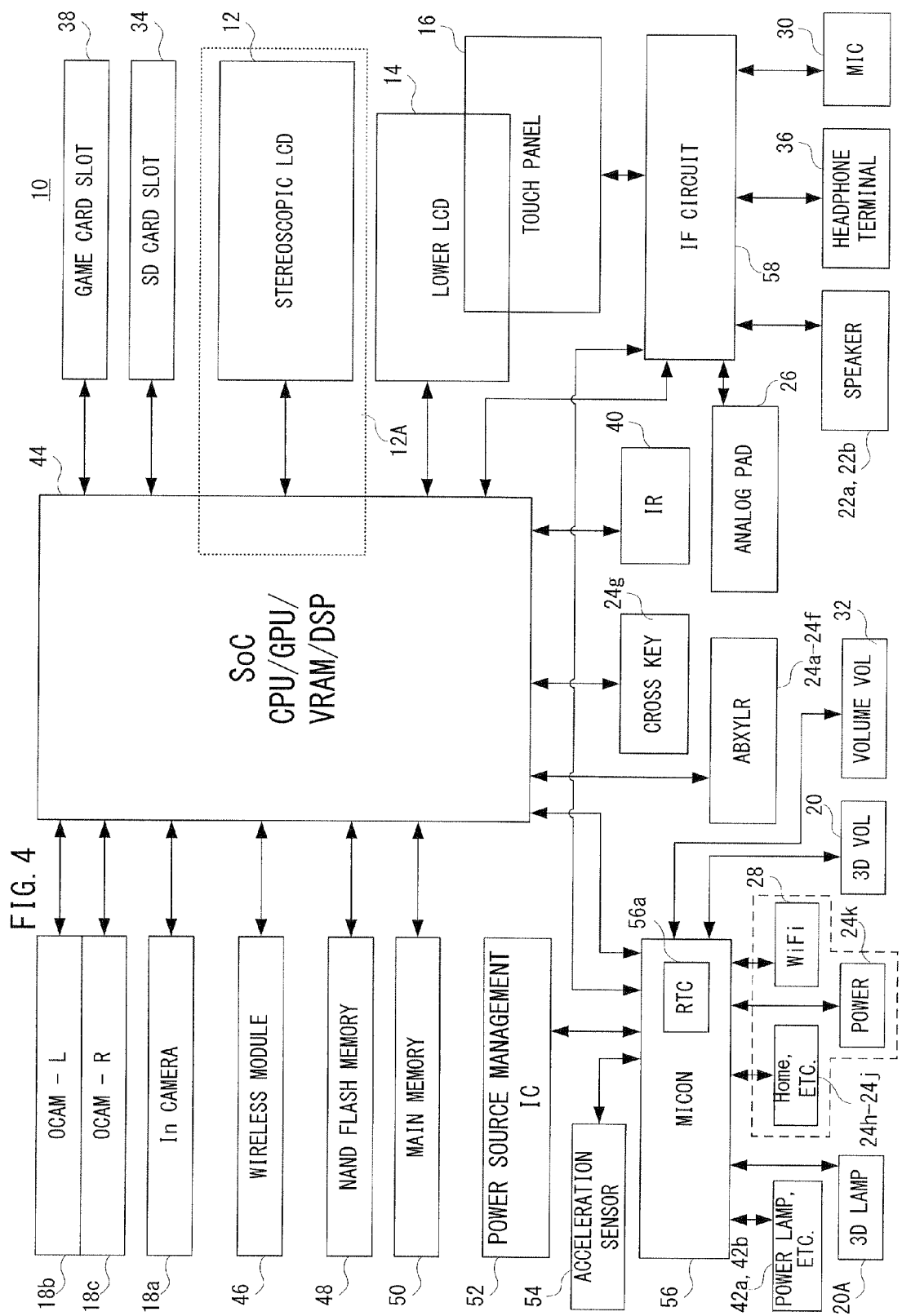
FIG. 4 shows an example non-limiting electric configuration of the game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving unit (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. The NAND-type flash memory 48 stores data to be saved, such as a camera image, a microphone voice, various databases for game, or the like. The main memory 50 gives a working area to the SoC 44. That is, in the main memory 50, various data and programs to be used in a game are stored, and the SoC 44 performs works by utilizing the data and program stored in the main memory 50.

The micon 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result by the acceleration sensor 54 is available as a motion input to the game program. In this case, the game program calculates the movement of the game apparatus 10 itself on the basis of the detection result, and execute processing depending on the calculation result. Also, the micon 56 includes an RTC (real-time clock) 56a, and counts a time by the RTC 56a to supply it to the SoC 44.

Figure 5:
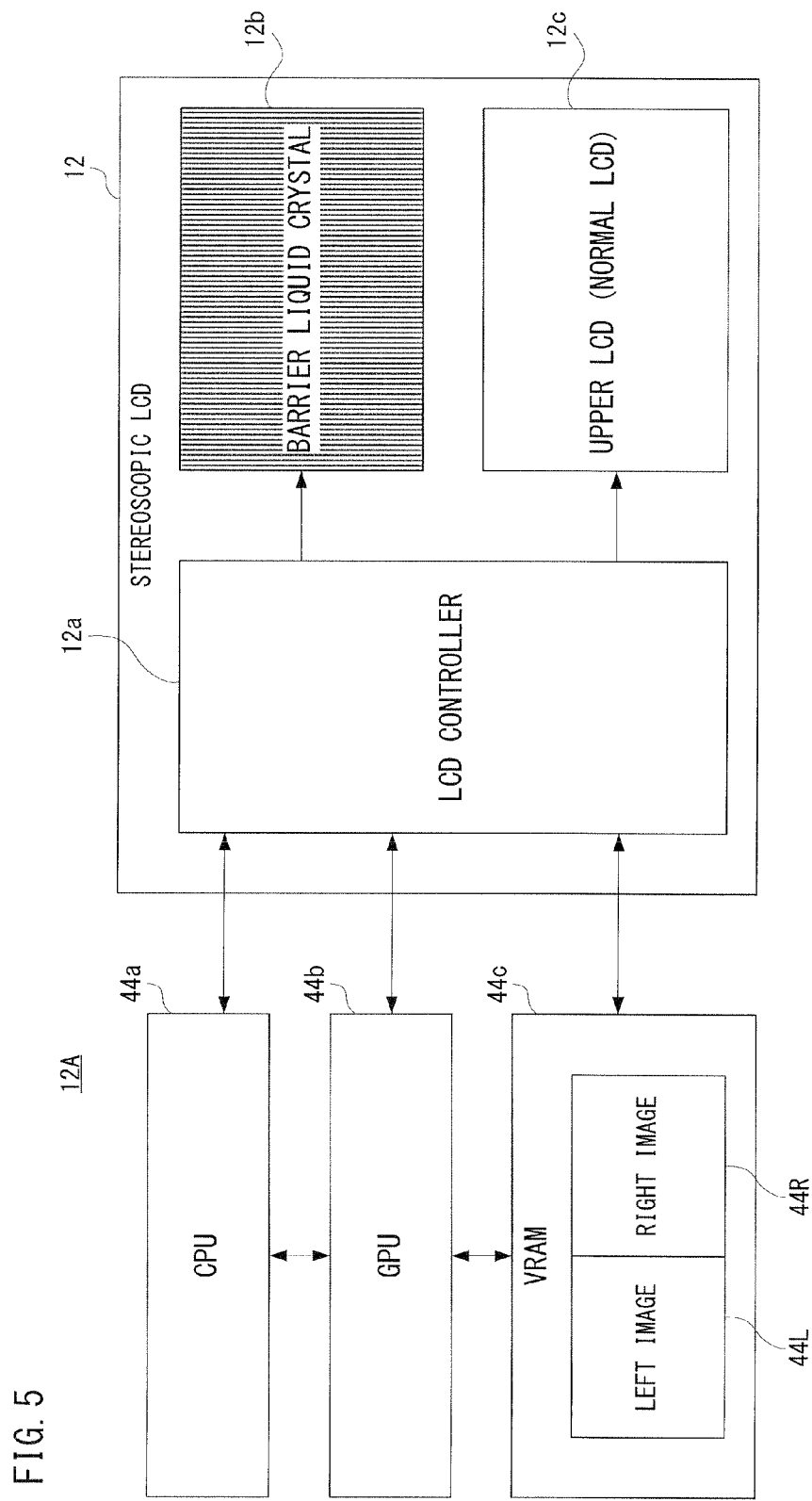
FIG. 5 shows an example non-limiting important part of the electric configuration of FIG. 4 (stereoscopic LCD controller being made up of the stereoscopic LCD and parts of the SoC)

FIG. 5 shows a stereoscopic LCD controller 12A being made up of the stereoscopic LCD 12 and a part of the SoC 44. The stereoscopic LCD 12 includes an LCD controller 12a, a barrier liquid crystal 12b and an upper LCD 12c. The barrier liquid crystal 12b includes a plurality of liquid crystal slits extending in a vertical (row) direction as shown in FIG. 6(A), and makes the right eye and the left eye view beams passing through pixels in a different row of the upper LCD 12c by alternately cutting off the beam from the backlight by the plurality of liquid crystal slits (3D display). The upper LCD 12c may be a general liquid crystal (for 2D display) similar to the lower LCD 14. The LCD controller 12a performs drawing on the upper LCD 12c under the control of the GPU 44b and then the CPU 44a, and turns the barrier liquid crystal 12b (applied voltage thereto) on and off. When the barrier liquid crystal 12b is turned off, the right eye and the left eye can view the beams passing through the pixels of all the rows on the upper LCD 12c as shown in FIG. 6(B) (2D display).

In the game apparatus 10 constructed below, an emulator program is executable. By using the emulator program, another game apparatus different in construction from the game apparatus 10, for example, a game apparatus that was offered past is emulated to thereby make the game program for the other game apparatus executable on the game apparatus 10 (another game apparatus is emulated, and the game program is executed on the emulated virtual hardware). That is, a game for another game apparatus can be played in the game apparatus 10. In this embodiment, the emulation processing is achieved by software, but may be achieved by hardware for emulation to be mounted on the game apparatus 10.

The game program to be emulated is downloaded into the game apparatus 10 from a server not shown via a network, and stored into a recording medium, such as the NAND flash memory 48, the SD card inserted into the SD card slot 34, or the like. The emulator program is also downloaded into the game apparatus 10 for each game program to be emulated along with the game program, and stored in the NAND flash memory 48, the SD card, or the like. Thus, the emulator program and the game program are provided as a set to have a one-to-one correspondence to thereby ensure compatibility of the emulation processing for each game program. In another embodiment, the game program and the emulator program may be configured to be stored in the game card inserted into the game card slot 38, and may then be copied from the game card so as to be stored in the NAND flash memory 48, or the like of the game apparatus itself.

Here, the object to be emulated in this embodiment is exclusively a game apparatus and a game program for 2D display, and thus, the stereoscopic LCD 12 is hereafter depicted as "upper LCD 12".

According to the emulator program of this embodiment, separately from a save function of the game program itself, a function (the function is called a "game marker function", and the data to be saved by the function is called a "game marker") of saving, information (execution state information) indicating an execution state of an object to be emulated by the CPU 44a (that is, another game apparatus different in configuration from the game apparatus 10 which is to be artificially (virtually) achieved by the emulation processing) at an arbitrary timing with a captured image of the game screen which is being emulated at this point is implemented. By utilizing the game marker function, the player determines which state is advantageous, the state previously saved and the current state comparing the current game screen and the saved game screen during progress of the game, and can continue to play the game if the current state is advantageous and return to the saved point if the state previously saved is advantageous.

Figure 7:
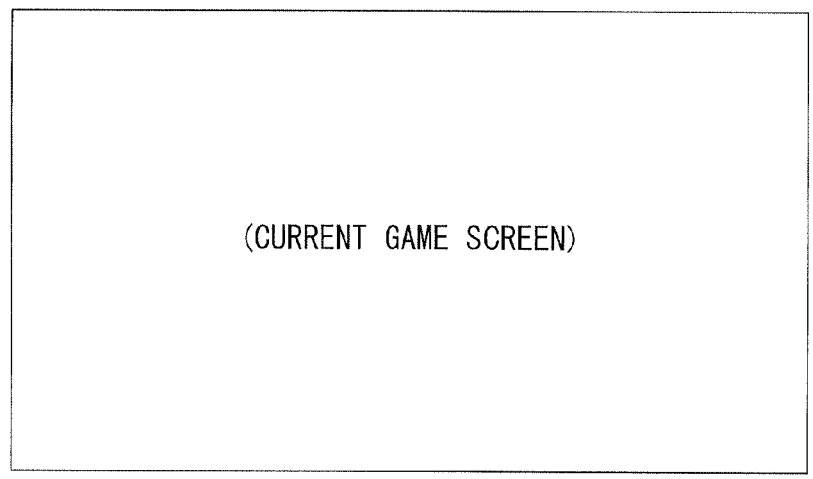
FIG. 7 show an example non-limiting configuration of upper and lower LCD screens.
Figure 7:
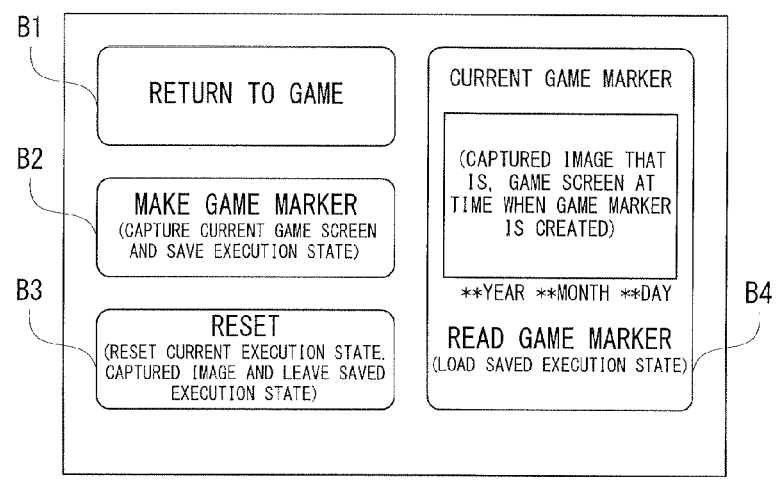

FIG. 7 shows an example non-limiting configuration of the upper and lower LCD screens to be displayed on the upper and lower LCDS 12 and 14 during emulation of the game program (one example of a user interface for allowing the user to utilize the game marker function). On the upper LCD 12, a current game screen based on a result of emulation of the game program is displayed, and on the lower LCD 14 with touch panel 16, an operation screen including four buttons B1 to B4 respectively indicating "RETURN TO GAME", "MAKE GAME MARKER", "RESET" and "READ GAME MARKER" are displayed.

The button B1 is a button for restarting the game during suspension. The button B2 is a button for capturing a current game screen, and saving current execution state information of the game program. The button B3 is a button for resetting the current execution state of the game program. That is, when the button B3 is pushed, the game is back to the start, but a captured image and saved execution state information remain. The button B4 is a button for loading the saved execution state information on which the aforementioned captured image (game screen at a time when the game marker is created) is pasted. The captured image is attached with date and time information (yearmonth**day) indicating when the game marker is created. Here, before a game marker is created, there is no captured image to be pasted, and thus, a message "GAME MARKER HAS NOT YET BEEN CRE- ATED" is shown instead of it. However, the date and time information and the message may be omitted.

Figure 8:
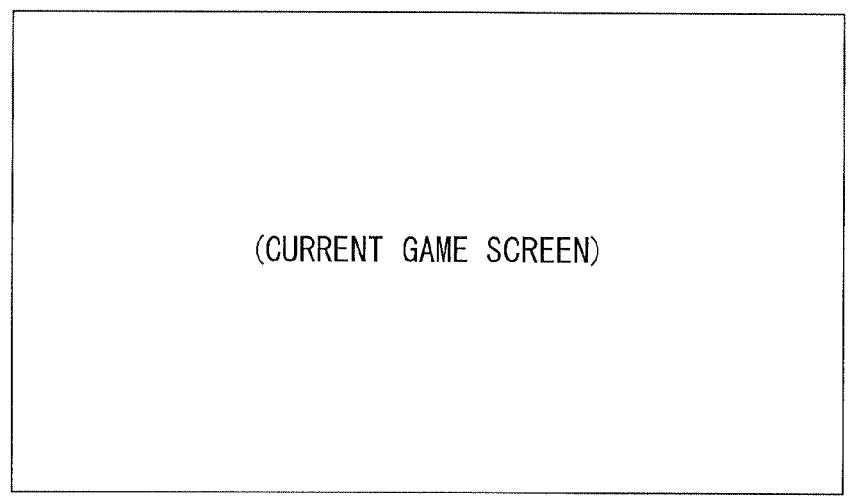
FIG. 8 shows an example non-limiting display state of the upper and lower LCDs.
Figure 8:
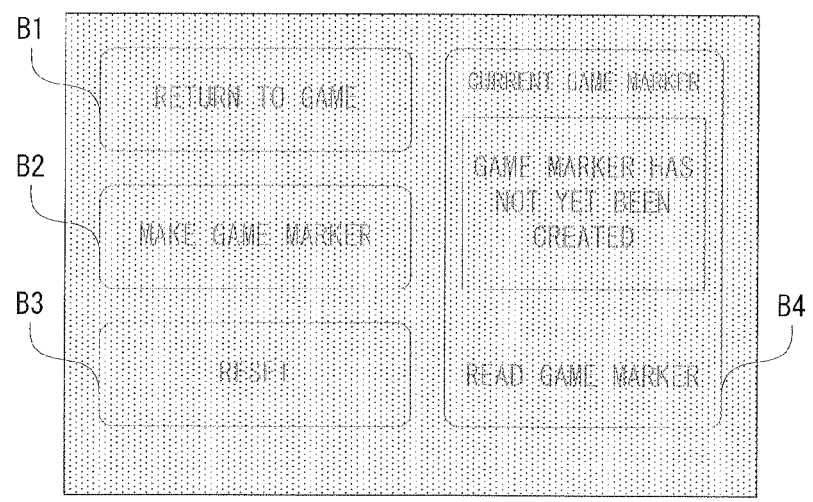
Figure 9:
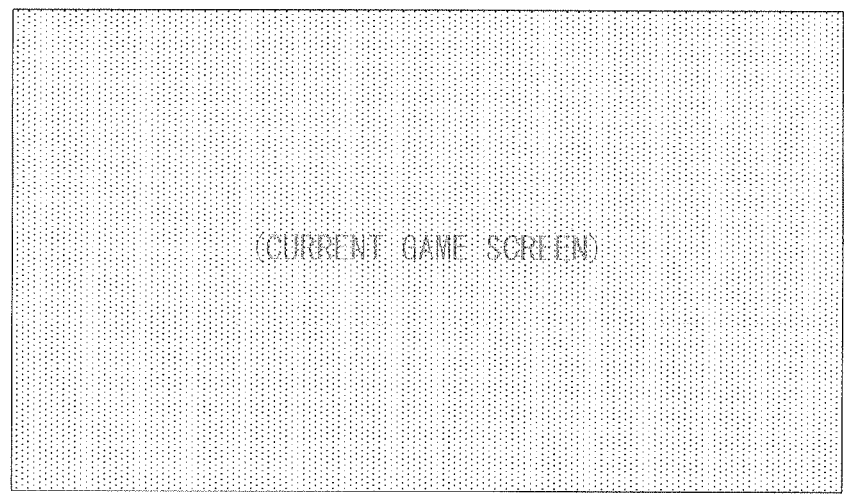
FIG. 9 shows an example non-limiting another display state of the upper and lower LCDs.
Figure 9:
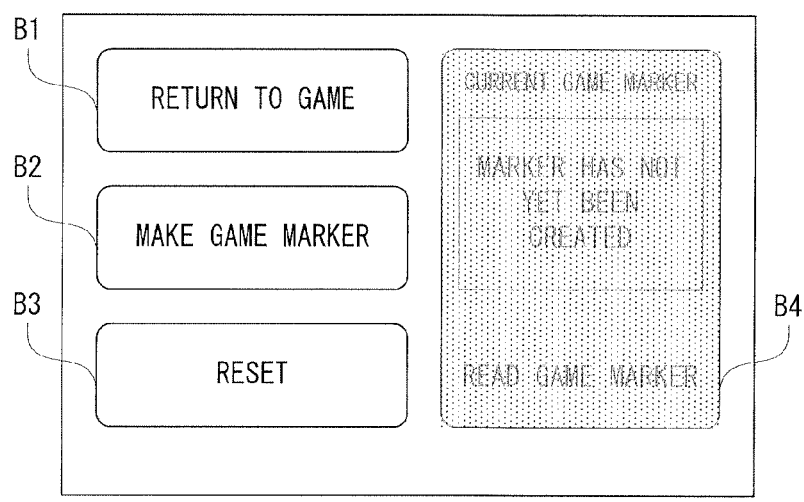
Figure 10:
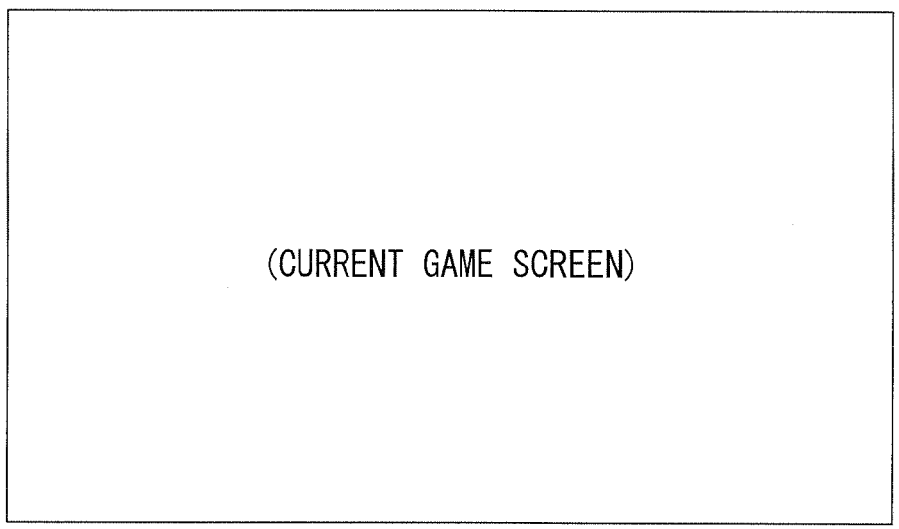
FIG. 10 shows an example non-limiting still another display state of the upper and lower LCDs.
Figure 10:
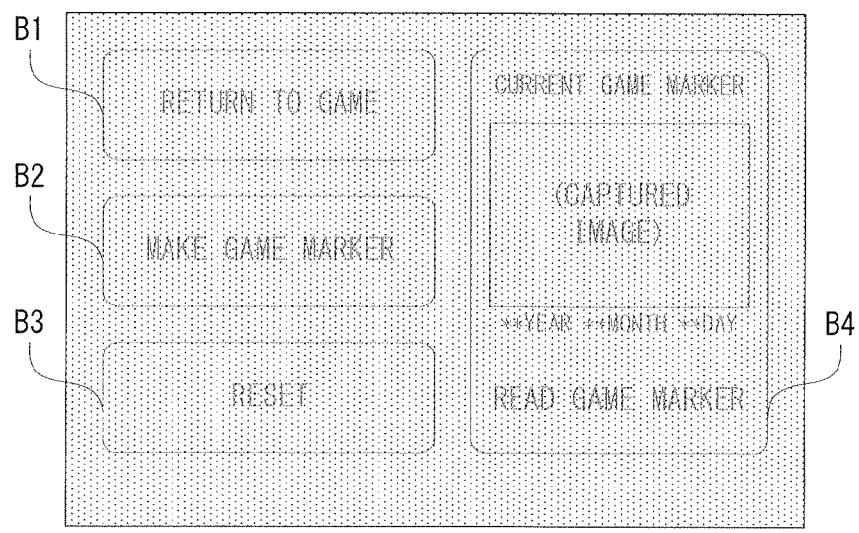
Figure 11:
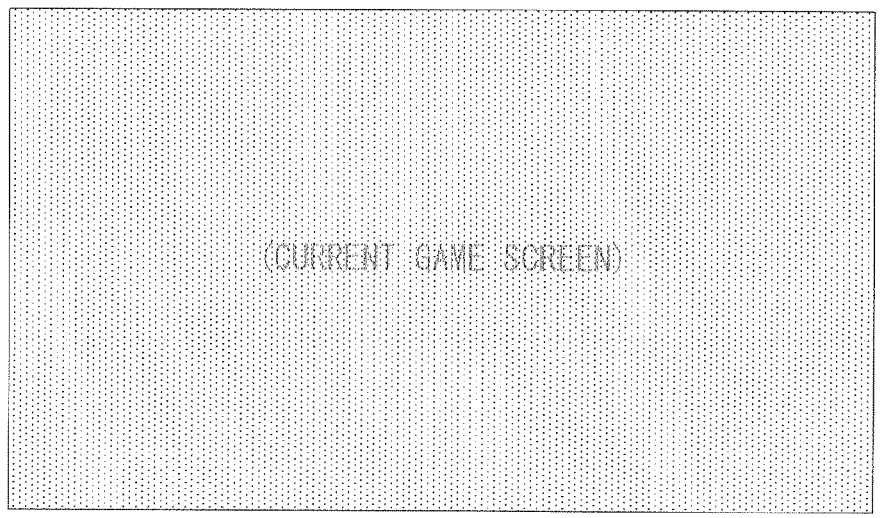
FIG. 11 shows an example non-limiting further another display state of the upper and lower LCDs.
Figure 11:
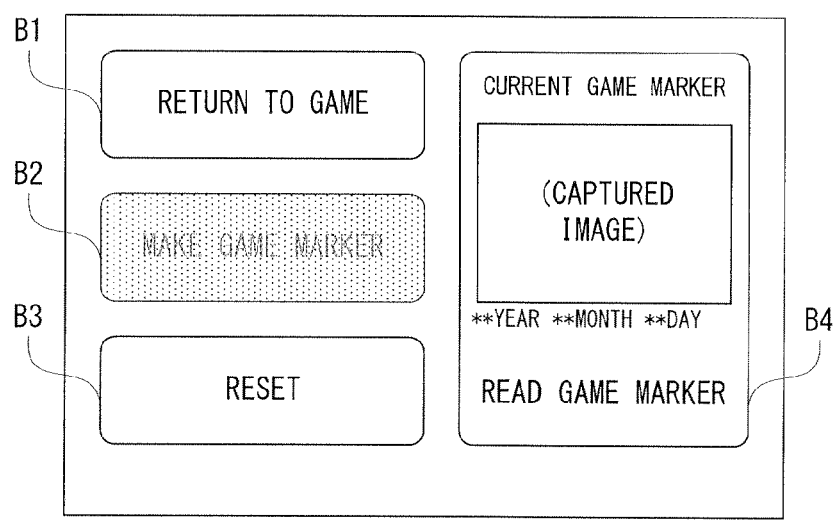

The game screen of the upper LCD 12 and the operation screen of the lower LCD 12 (hereinafter, referred to as "upper screen 12 and lower screen 14") are controlled as shown in FIG. 8 to FIG. 11 depending on whether the game is progressing or is being suspended, or whether there is a game marker. That is, during progress of the game, the upper screen 12 is in high brightness, and the lower screen 14 is in low brightness (buttons B1 to B4 are dimly viewed) as shown in FIG. 8 or FIG. 10. On the other hand, during suspension of the game, the upper screen 12 is in low brightness (game screen is dimly viewed), and the lower screen 14 is entirely in high brightness as shown in FIG. 9 or FIG. 11. Here, even if the lower screen 14 is entirely in high brightness, if there is not a game marker, the part corresponding to the button B4 is in low brightness as shown in FIG. 9, and if there is a game marker, the part corresponding to the button B2 is in low brightness (letters, such as "READ GAME MARKER" and the captured image are dimply viewable) as shown in FIG. 11. Here, changes in the screen is for making the user note the screen in high brightness and making the content of the screen in low brightness viewable at the same time, and therefore, other methods are applicable if they have the same effect. For example, instead of making the brightness of the screen low, provision of a translucently shaded area makes the user understand the contents of the screen, and making the user note the other screen at the same time.

As shown in FIG. 8 or FIG. 10, when the lower screen 14 is entirely in low brightness, all of the buttons B1 to B4 do not function effectively (non-active). In this situation, the entire lower screen 14 functions as a switch button for making the buttons B1 to B4 active. That is, when a touch operation on an arbitrary part of the lower screen 14 is detected in a state that the lower screen 14 is in low brightness, the lower screen 14 turns to high brightness to make the buttons B1 to B4 (at least a part thereof) active as shown in FIG. 9 or FIG. 11. Here, in the state shown in FIG. 9, there is no game marker, and thus, the button B4 is made inactive (non-active), and in the state shown in FIG. 10, there is a game marker, and thus, the button B2 is made inactive (non-active).

Figure 12:
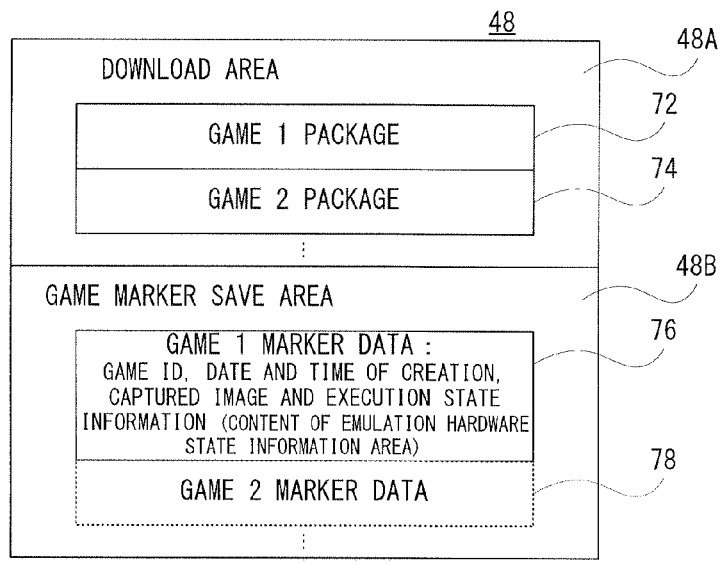
FIG. 12 shows an example non-limiting memory map of the game apparatus.
Figure 12:
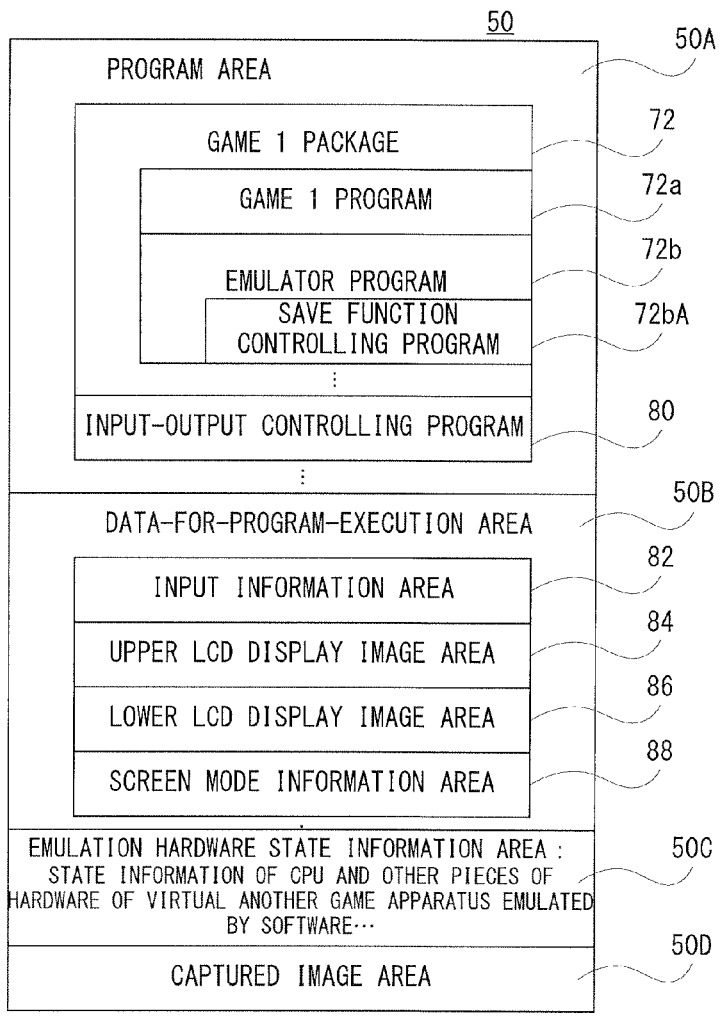

FIG. 12 shows a memory map of the game apparatus 10 in a case that the game program is emulated. Referring first to FIG. 12(A), in the NAND flash memory 48, a download area 48A and a game marker save area 48B are formed. In the download area 48A, a game 1 package 72, a game 2 package 74 . . . downloaded from a server not shown via networks are stored. In the game marker save area 48B, game 1 marker data 76, game 2 marker data 78 . . . respectively corresponding to the game 1 package 72 and the game 2 package 74 . . . are stored. Thus, the game marker data is created for each game.

The marker data of each game includes a game ID, date and time of creation, a captured image and execution state information, etc. The game ID is an ID (identification information) indicating to which game the game marker belongs. The date and time of creation is information indicating date and time when the game marker is created, and can be obtained by reading the output value of the RTC 56a in response to a push operation of the button B2. The captured image is a captured image of the game screen at a time when the game marker is created, and can be obtained by capturing an image within the VRAM 44c in response to a push operation of the button B2. The execution state information is information indicating emulation and execution state information of the game program at a time when the game marker is created, and can be obtained by copying the information in an emulation hardware state information area 50C described later in response to a push operation of the button B2. It should be noted that as to the game for which the game marker has not been created yet, the game marker data is not stored (or initial data indicating that the game marker of the game has not yet been created is stored). Here, the download area 48A and the game marker save area 48B may be formed in an SD memory card (not illustrated).

Referring next to FIG. 12(B), in the main memory 50, a program area 50A, a data-for-program-execution area 50B, an emulation hardware state information area 50C and a captured image area 50D are formed, and in the program area 50A, out of the game packages stored in the download area 48A, arbitrary one, that is, the game 1 package 72, here is developed. Here, in a case that the game 2 is played, the game 2 package 74 is developed in place of the game 1 package 72.

The game 1 package 72 is made up of a game 1 program 72a, an emulator program 72b, etc. The emulator program 72b includes a save function controlling program 72bA. The game 1 program 72a is a game program for another game apparatus, and implements various functions related to the game 1 via the SoC 44 and other pieces of hardware (see FIG. 4) by cooperating with the emulator program 72b. The emulator program 72b is a program (software emulator) for emulating the game 1 program 72a on the hardware of the game apparatus 10.

Figure 13:
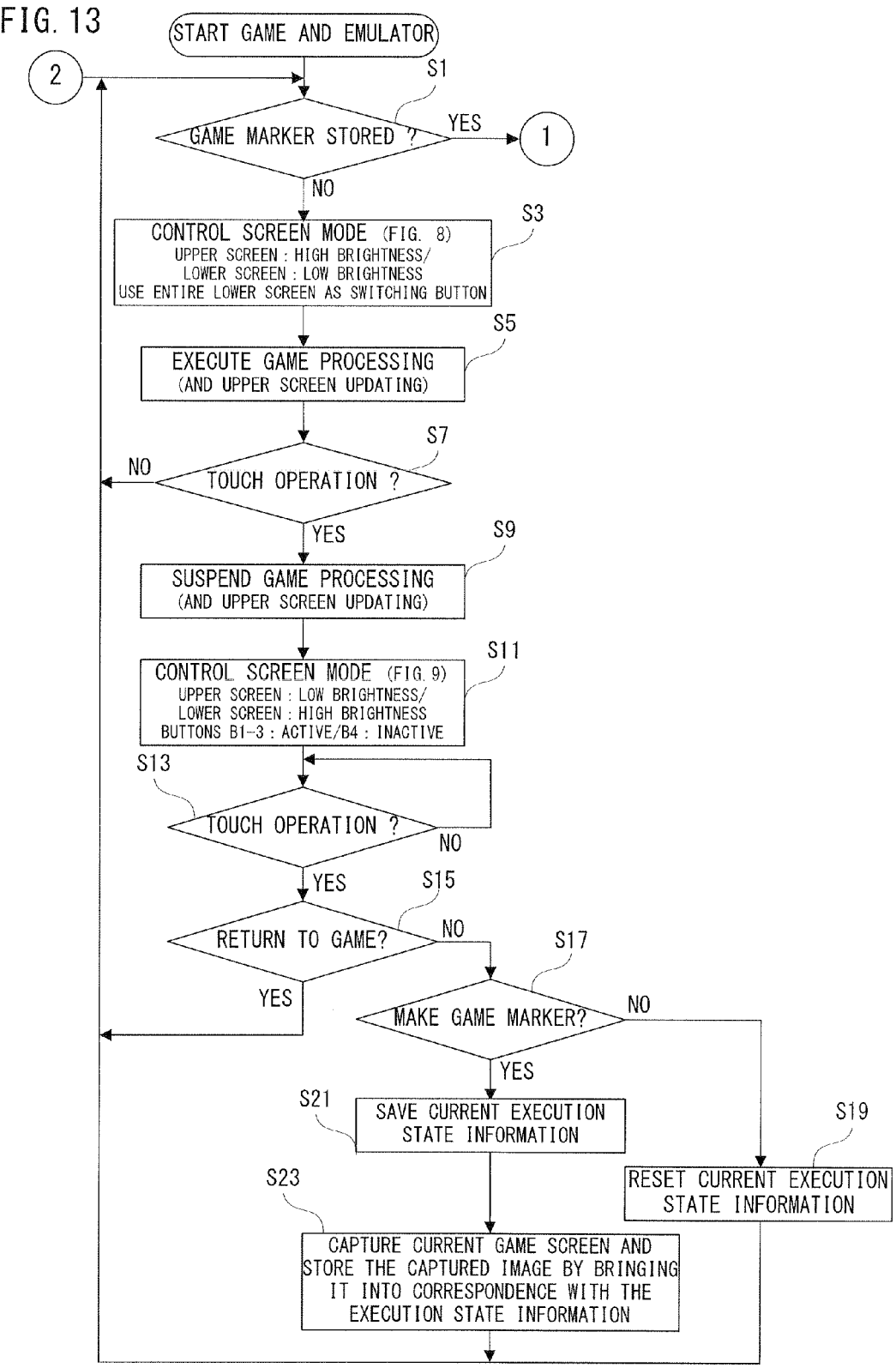
FIG. 13 shows an example non-limiting part of a flowchart showing an operation by a CPU.
Figure 14:
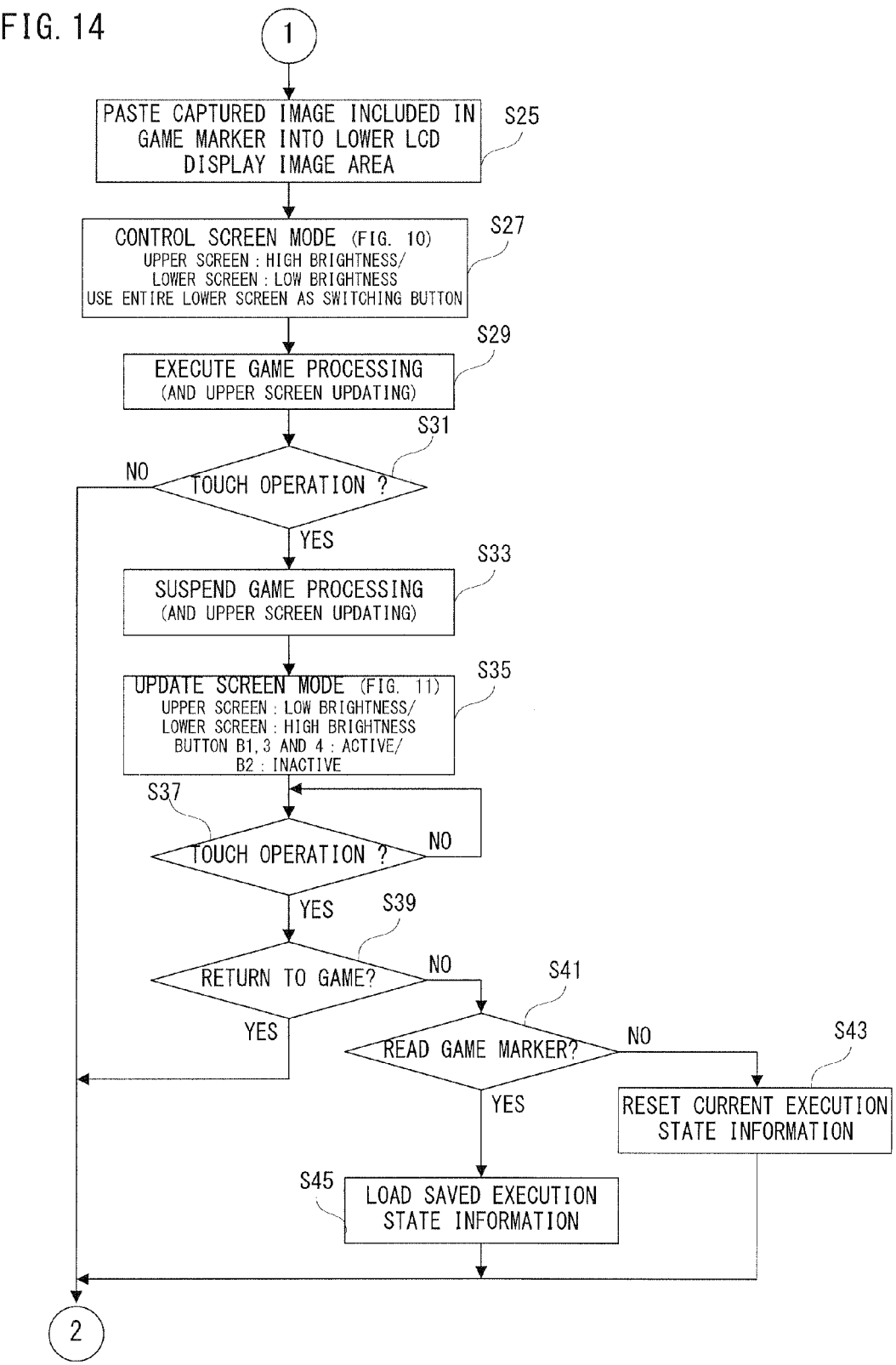
FIG. 14 shows an example non-limiting another part of the flowchart showing the operation by the CPU.

The save function controlling program 72bA is a program for causing the user to save the emulation and execution state of the game 1 program 72a at an arbitrary timing through the screens shown in FIG. 8-FIG. 11 while the game 1 program 72a is emulated by the emulator program 72b, and loading the saved emulation and execution state, and corresponds to the flowcharts shown in FIG. 13 and FIG. 14.

In the program area 50A, an input-output controlling program 80 is also stored. The input-output controlling program 80 is a program for detecting an operation input to the touch panel 16, the ABXY button 24a to 24d, etc., or performing an output display to the upper and lower LCDs 12 and 14, and used by the game 1 program 72a and the emulator program 72b.

On the other hand, the data-for-program-execution area 50B includes an input information area 82, an upper and lower LCD display image areas 84 and 86, a screen mode information area 88, etc. In the input information area 82, input information indicating an operation input to the touch panel 16, the ABXY buttons 24a to 24d, etc. is repetitively written by the input-output controlling program 80 (1/60 sec. cycle, for example). Into the upper LCD display image area 84, a display image for the upper LCD 12, that is, an image of the game screen is repetitively written by the game 1 program 72a. Into the lower LCD display image area 86, a display image for the lower LCD 14, that is, an image of the operation screen is repetitively written by the emulator program 72b. Into the screen mode information area 88, screen mode control information to be generated by the save function controlling program 72bA is repetitively written.

Thus, in the data-for-program-execution area 50B, the data for program execution utilized when the CPU 44a emulates the game 1 program 72a by the emulator program 72b is stored.

Furthermore, in the emulation hardware state information area 50C, emulation hardware state information indicating a state of the hardware (CPU, VRAM, I/O register, for example) of virtual another game apparatus to be implemented in a case that the CPU 44a emulates the game 1 program 72a by the emulator program 72b.

Accordingly, if the emulation hardware state information within at least the emulation hardware state information area 50C is saved as execution state information at an arbitrary timing, the emulation hardware state at a time of being saved is reproduced by loading the saved execution state information, and the game can be reproduced from this point.

It should be noted that if there is information which does not change even after the CPU42a emulates the game program 72a by the emulator program 72b within the emulation hardware state information area 50C, this kind of information may be excluded from the object to be saved.

On the other hand, the data for program execution within the data-for-program-execution area 50B can be generated on the basis of the reproduced emulation hardware state, and therefore, if the emulation hardware state information is saved, it need not be included in the object to be saved, but a part or all of them may be included in the object to be saved. Here, in a case that the emulator program 72b emulates the game program 72a e (while emulating) and executes it, the data for program execution may be included in the object to be saved in place of the emulation hardware state information.

Also, into the captured image area 50D, an image captured by the save function controlling program 72bA, that is, an image captured from the VRAM 44c at a timing when the execution state information is saved is written. If the captured image is saved by being brought into correspondence with the execution state information, it is possible to intuitively know to which time point the saved execution state information belongs when it is thereafter decided whether the saved execution state information is to be loaded, or the game is to be continued.

The CPU 44a implements the above-described game marker function by executing the processing according to flowcharts shown in FIG. 13 and FIG. 14 when the game 1 program 72a is emulated by the emulator program 72b.

Referring first to FIG. 13, when the game 1 program 72a and the emulator program 72b are started, the CPU 44a determines whether or not a marker of the game 1 is stored (has already been created) with reference to the game marker save area 48B in a first step S1. If the game 1 marker data 76 is stored in the game marker save area 48B, "YES" is determined in the step S1, and the process proceeds to a step S25 (as described later). If the game 1 marker data 76 is not stored in the game marker save area 48B (or, if initial data indicating that the marker of the game 1 has not been created yet is stored), "NO" is determined in the step S1, and the process proceeds to a step S3.

In the step S3, a mode control for displaying screens shown in FIG. 8 on the upper and lower LCDs 12 and 14 is performed, and screen mode information indicating the result of the control is written to the screen mode information area 88. Thus, on the upper LCD 12, a current game screen (generally, motion image) is displayed in high brightness, and on the lower LCD 14, an operation screen including the buttons B1 to B4 is displayed in low brightness. In the screen mode information area 88, the screen mode information corresponding to screens of FIG. 8 is written. Then, in a step S5, game processing according to the game 1 program 72a and the emulator program 72b, and update processing of the game screen of the upper LCD 12 (abbreviated as "upper screen" as necessary) based on the result of the processing is executed, and then, the process proceeds to a step S7.

In the step S7, with reference to the input information area 82, it is determined whether or not a touch operation on the operation screen of the lower LCD 14 (abbreviated as "lower screen" as necessary) is performed after the screen mode control in the step S3, and if "NO", the process returns to the step S1. If "YES" in the step S7, the process shifts to a step S9 to suspend the game processing and the upper screen update processing. Then, the process proceeds to a step S11 to perform a mode control for displaying screens shown in FIG. 9 on the upper and lower LCDs 12 and 14, and the screen mode information indicating the result of the control is written to the screen mode information area 88. Thus, on the upper LCD 12, a game screen (generally, still image) at a time of the touch operation is displayed in high brightness, and on the lower LCD 14, an operation screen is displayed entirely in high brightness. Here, out of the buttons B1 to B4 within the operation screen, the buttons B1 to B3 are active and thus displayed in high brightness while the button B4 is inactive (non-active), and thus still displayed in low brightness. Furthermore, in the screen mode information area 88, screen mode information corresponding to screens of FIG. 9 is written.

Here, in the aforementioned step S7, in place of a touch operation, or in addition thereto, the presence or absence of a predetermined button operation, for example, an operation of pushing and holding the X button 24c may be determined. In this case, when a touch operation is detected, or when a push and hold operation of the X button 24c is detected in a state that the screens of FIG. 8 are displayed, the screens of FIG. 8 change to the screens of FIG. 9. Generally, it is preferable that in the game apparatus 10, an operation for controlling the game marker function, such as a screen mode switch is performed by utilizing an operating means that is not inherently used in the game 1.

Next, in a step S13, it is determined whether or not a touch operation on the lower screen is performed after the screen mode control in the step S11 with reference to the input information area 82, and if "NO", after a wait of a predetermined time (1/60 sec., for example), a similar determination is repeated. If the determination result in the step S13 is changes from "NO" to "YES", the process shifts to a step S15 to determine whether or not the touch operation designates "RETURN TO GAME", specifically, whether or not touched position on the lower screen is within the display region of the button B1, and if "YES" here, the process returns to the step S1. Thus, the game 1 is restarted from the suspended time point.

If "NO" in the step S15, the process shifts to a step S17 to determine whether or not the touch operation designates "MAKE GAME MARKER", specifically, whether or not the touched position on the lower screen is within the display region of the button B2. If "NO" here, it is considered that the touch operation designates "RESET", and the information within the data-for-program-execution area 50B, that is, the current execution state information is reset in a step S19. Thus, the game 1 goes back to the start.

If "YES" in the step S17, the current execution state information is saved in a step S21, a current game screen is captured, and the captured image is brought into correspondence with the current execution state information and saved as game 1 marker data 76 in a step S23. More specifically, when a touch operation within the region of the button B2 is performed in a state that screen mode information indicating the screen of FIG. 9 is stored in the screen mode information area 88, contents of the emulation hardware state information area 50C, that is, current execution state information are saved in the game marker save area 48B (S21), and the content of the VRAM 44c, that is, a current game screen is saved by bringing it into association with the execution state information saved in the game marker save area 76 (S23) at the same time. To the execution state information and the captured image that are thus saved, the game ID of the game 1 program 72a and the current time data (date and time of creation of the game marker) indicated by the RTC 56a are added to thereby form the game 1 marker data 76 within the game marker save area 48B. Thereafter, the process returns to the step S1.

Accordingly, the CPU 44a processes a loop making up of the aforementioned steps S1 to S23 until the game marker is created, and the process exits from the loop after the game marker is created to shift to the step S25.

In the step S25, the captured image included in the game 1 marker data 72 (after being resized into an appropriate size) is pasted at a predetermined position within the lower LCD display image area 86. Then, in a step S27, a mode control for displaying screens as shown in FIG. 10 on the upper and lower LCDs 12 and 14 is performed, and the screen mode information indicating the result of the control is written to the screen mode information area 88. Thus, on the upper LCD 12, a current game screen is displayed in high brightness, and on the lower LCD 14, an operation screen including the buttons B1 to B4 is displayed in low brightness. At this time, on the button B4, the captured image, that is, the game screen at a time when the game marker is created is pasted. Furthermore, into the screen mode information area 88, the screen mode information corresponding to the screen in FIG. 10 is written. Next, in a step S29, game processing and upper screen update processing are executed, and the process proceeds to a step S31.

In the step S31, it is determined whether or not a touch operation on the lower screen is performed after the screen mode control in the step S27 with reference to the input information area 82, and if "NO", the process returns to the step S1. If "YES" in the step S31, the game processing and the upper screen update processing are suspended in a step S33. Then, the process proceeds to a step S35 to perform a mode control for displaying screens as shown in FIG. 11 on the upper and lower LCDs 12 and 14, and the screen mode information indicating the result of the control is written to the mode area 88. Thus, on the upper LCD 12, a game screen at a time of a touch operation is displayed in high brightness, and on the lower LCD 14, an operation screen is displayed entirely in high brightness. Here, out of the buttons B1 to B4 within the operation screen, the buttons B1, B3, and B4 are active and thus displayed in high brightness while the button B2 is inactive (not active) and thus still displayed in low brightness. Furthermore, in the screen mode information area 88, screen mode information corresponding to the screen of FIG. 11 is written. Thereafter, the process proceeds to a step S37.

In the step S37, it is determined whether or not a touch operation on the lower screen is performed after the screen mode control in the step S35 with reference to the input information area 82, and if "NO", after a wait of a predetermined time, a similar determination is repeated. If the determination result in the step S37 shifts from "NO" to "YES", the process shifts to a step S39 to determine whether or not the touch operation designates "RETURN TO GAME", specifically, whether or not the touched position on the lower screen is within the display region of the button B1, and if "YES" here, the process returns to the step S1. Thus, the game 1 is restarted from the suspended time point.

If "NO" in the step S39, the process shifts to a step S41 to determine whether or not the touch operation designates "READ GAME MARKER", specifically, whether or not the touched position on the lower screen is within the display region of the button B4. If "NO" here, it is considered that the touch operation designates "RESET", and in a step S43, the current execution state information is reset. Thus, the game 1 goes back to the start.

If "YES" in the step S41, the execution state information included in the game 1 save data 76 formed in the game marker save area 48B is loaded into the data-for-program-execution area 50B and the emulation hardware state information area 50C in a step S45. Thus, the content of the emulation hardware state information area 50C is restored to a state at a time of creating the game marker. Thereafter, the process returns to the step S1. Thus, the game 1 goes back to the game marker creation time for restart.

Accordingly, the CPU 44a performs a loop processing making up of the aforementioned steps S1 and S25 to S45 after the game marker is created.

Figure 15:
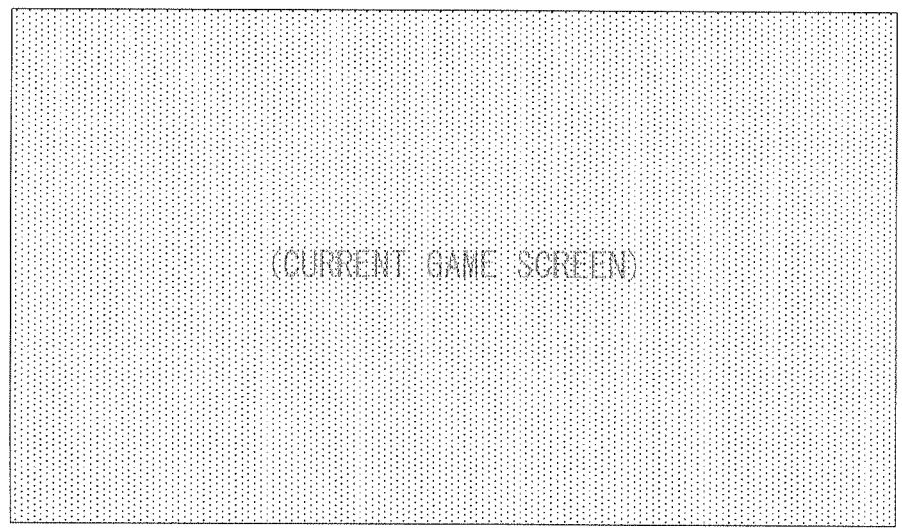
FIG. 15 shows an example (the second embodiment) non-limiting displayed states of the upper and lower LCDs, corresponding to FIG. 11.
Figure 15:
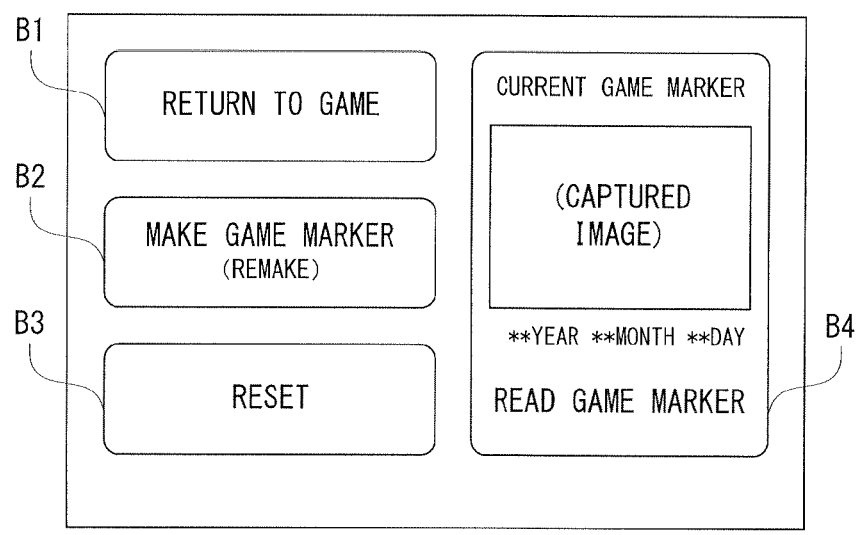

Here, in this embodiment (first embodiment), the game marker retains the state that is first created, but may be updated. Such an embodiment (second embodiment) is implemented by modifying a part of the screen shown in FIG. 11 into a screen shown in FIG. 15, and modifying a part of the flowcharts shown in FIG. 13 and FIG. 14 (steps S31 to S45 in FIG. 14) into a flowchart shown in FIG. 16. On the screen in FIG. 15, the button B2 is also active similar to the other buttons B1, B3 and B4. In the flowchart in FIG. 16, after "NO" is determined in the step S39, a step S40 is inserted before the process sifts to the step S41.

In the step S40, similar to the step S17 in FIG. 13, it is determined whether or not the detected touch operation designates "MAKE GAME MARKER", and if "NO" here, the process shifts to the step S41. If "YES" in the step S40, current execution state information is saved in a step S44a, and a current game screen is captured in a step S44b, and the captured image is saved as new game 1 marker data 76 by being brought into correspondence with the current execution state information. That is, the game 1 marker data 76 which has been stored in the game marker save area 48B at that time is overwritten by the game 1 marker data 76 thus created (recreated). After saving, the process returns to the step S1.

Steps (S1-S45) other than the aforementioned steps S40, S44a and S44b are equivalent to the corresponding steps (S41-S45) described above, and therefore, a detailed description thereof is omitted.

As understood from the above description, according to the first embodiment or the second embodiment, the CPU 44a of the game apparatus 10 stores the state of the game (contents of the data-for-program-execution area 50B and/or the emulation hardware state information area 50C) which is being emulated as execution state information in the game marker save area 48B, and stores the captured image of the game screen by bringing it into correspondence with the execution state information (S21, S23, S44a, S44b). Furthermore, during execution of the game, the captured image stored in the game marker save area 48B is displayed on the lower LCD 14 while the game screen is displayed on the upper LCD 12 (S35, S35a). A selecting operation from the user is accepted in a state that the game screen and the captured image are thus displayed (S41). Then, in response to the selecting operation, by using the execution state information which is being brought into correspondence with the selected captured image, the state of the game is restored (S45).

Thus, at a time of loading the saved execution state information, the game screen which is being executed and the captured image at a time when save is executed are simultaneously displayed, to thereby decide whether or not to load by comparing the state during execution and the saved state. Thus, it is possible to prevent a more disadvantageous state than before loading due to erroneous loading from occurring.

Here, in the first embodiment or the second embodiment, one game marker is provided for each game, but a plurality of game markers may be created for each game. More specifically, in the aforementioned second embodiment, for example, when a new game marker is saved in the step S44b, instead of overwriting the original game marker, another game marker is further depicted without changing the original game marker. In this case, on the screen in FIG. 15, the button B4 for reading the game marker is displayed by the number of the created game markers (B4*a*, B4*b* . . . : not illustrated). Alternatively, if the button B4 remains one, but a plurality of game markers are displayed so as to be turned on the button B4, it is more preferable since the number of buttons can be decreased. In addition, if an arbitrary game marker is selectively erasable (or all the game markers are erasable at a time) by addition of a button (not illustrated) for erasing a game marker, it is more preferable since the game markers are easily managed.

Additionally, in the first embodiment or the second embodiment, an object to be emulated shall be a game program for 2D display, but a game program for 3D display may be emulated. Or, when the game program for 2D display is emulated, a transformation from a 2D display to a 3D display may be performed. More specifically, in a case that a game screen for 2D display is displayed on the upper LCD 12 in a 3D display manner, the CPU 44*a* may generate right and left image data with parallax from the image data of the game screen stored in the upper LCD display image area 84, and write it in the VRAM 44*c* as a left image 44L and a right image 44R, with reference to FIG. 5.

Additionally, in the first embodiment or the second embodiment, an emulator program dedicated to each game program is prepared, but a versatile emulator program may be prepared.

Also, in the first embodiment or the second embodiment, the emulator program 72*b* emulates another game apparatus (hardware thereof), and executes the game program 72*a* in the emulated pseudo (virtual) game apparatus (hardware), but the emulator program 72*b* may emulate the game program 72*a* itself (while emulating), and in such a case, the emulation hardware state information area 50C is erased from the main memory 50 (see FIG. 12(B)). Then, one that saved in the game marker save area 48B as execution state information is mainly contents of the data-for-program-execution area 50B.

In the above, a description is made on the game apparatus 10, but this example embodiment can be applied to various information processing apparatuses (cellular phone, PDA, various home information appliances, etc. other than the game machine) having a memory (semiconductor memories, such as RAM, flash memory, and storage medium, such as hard disk, optical disk, etc. may be possible), a display surface (LCD, etc.), and a computer (CPU, SoC, processor, microcomputer, etc.). Here, the memory and/or the display surface may be added externally. The example embodiment can be applied to a display controlling system in which respective processing for controlling a save function is distributably performed by a plurality of computers, or the like. In addition, the example embodiment can be applied to a game program for such an information processing apparatus or system and application programs other than games. If the example embodiment is applied to an application program, "games" denoted in the detailed description of no-limiting example embodiments and FIG. 8 to FIG. 16 are read as "applications".

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

Furthermore, it should be understood that overall the example embodiment a representation of a singular form also includes a concept of the plural form unless otherwise stated. Accordingly, an article or an adjective in the singular (for example, "a", "an", "the", etc. for English) also includes a concept of the plural form unless otherwise stated.

What is claimed is:

1. A non-transitory storage medium storing a save controlling program to be executed by a computer of a game apparatus, the save controlling program causes said computer to function as:
    a saver which stores a state of a game during execution as execution state information in a memory, and stores a captured image of a game screen by bringing it into correspondence with said execution state information in said memory at a time;
    a captured image displayer which displays the captured image stored by said saver on a display surface with the game screen displayed on said display surface, during execution of the game;
    a selecting operation acceptor which accepts a selecting operation from a user in a state that the game screen and the captured image are displayed by said captured image displayer; and
    a state restorer which restores a state of the game by using the execution state information which is brought into correspondence with the captured image selected in response to said selecting operation.

2. A non-transitory storage medium storing a save controlling program according to claim 1, wherein
    said state restorer leaves the execution state information to render it reusable even after the state of the game is restored.

3. A non-transitory storage medium storing a save controlling program according to claim 1, wherein
    said save controlling program causes said computer to further function as a saving operation acceptor which accepts a save executing operation from the user in a state that the game screen and the captured image are displayed by said captured image displayer, and
    said saver stores the execution state information in response to said save executing operation.

4. A non-transitory storage medium storing a save controlling program according to claim 1 wherein
    said save controlling program causes said computer to further function as a suspender which suspends the game, and
    said selecting operation acceptor is made active in a state that the game is suspended by said suspender.

5. A non-transitory storage medium storing a save controlling program according to claim 3, wherein
    said save controlling program causes said computer to further function as a suspender which suspends the game, and
    said selecting operation acceptor and said saving operation acceptor are made active in a state that the game is suspended by said suspender.

6. A non-transitory storage medium storing a save controlling program according to claim 1, wherein
    said display surface includes a first display screen and a second display screen, and
    said game screen is displayed on said first display screen, and said captured image is displayed on said second display screen.

7. A non-transitory storage medium storing a save controlling program according to claim 6, wherein said second display screen is provided with a touch panel, and said selecting operation acceptor detects a touch operation on the captured image displayed on said second display screen by said touch panel, and accepts it as said selecting operation.

8. A non-transitory storage medium storing a save controlling program according to claim 7, wherein said save controlling program causes said computer to further function as a suspender which suspends the game when a touch operation on said second display screen is detected during execution of the game, and said selecting operation acceptor is made active in a state that the game is suspended by said suspender.

9. A non-transitory, storage medium storing a save controlling program according to claim 1, wherein said save controlling program is a part of an emulator program causing the computer of said game apparatus to compatibly execute a game program for another game apparatus different in construction from said game apparatus, said memory includes a data-for-execution memory which stores data for execution to be utilized when said computer compatibly executes said game program by said emulator program, and a save memory which stores said execution state information, said saver includes an execution state memory controller which stores contents of said data-for-execution memory at a timing designated by the user as at least a part of said execution state information in said save memory regardless of progress of the game, and a captured image memory controller which stores the game screen at the designated timing as said captured image by bringing it into correspondence with said execution state information in said save memory.

10. A non-transitory storage medium storing a save controlling program according to claim 9, wherein said data-for-execution memory further includes a virtual state information memory for storing virtual state information indicating a virtual state of the other game apparatus realized as a result of compatible execution of said game program by said computer by using said emulator program, and said execution state memory controller stores contents of said virtual state information memory at the timing designated by the user as at least said execution state information in said save memory.

11. A game apparatus, comprising:

a saver which stores a state of a game during execution as execution state information in a memory, and stores a captured image of a game screen by bringing it into correspondence with said execution state information in said memory at a time;

a captured image displayer which displays the captured image stored by said saver on a display surface with the game screen displayed on said display surface, during execution of the game;

a selecting operation acceptor which accepts a selecting operation from a user in a state that the game screen and the captured image are displayed by said captured image displayer; and a state restorer which restores a state of the game by using the execution state information which is brought into correspondence with the captured image selected in response to said selecting operation.

12. A saving method to be executed in the game apparatus, including:

storing a state of a game during execution as execution state information in a memory, and storing a captured image of a game screen by bringing it into correspondence with said execution state information in said memory at a time;

displaying the stored captured image on a display surface with the game screen displayed on said display surface, during execution of the game;

accepting a selecting operation from a user in a state that the game screen and the captured image are displayed by said displaying; and restoring a state of the game by using the execution state information which is brought into correspondence with the captured image selected in response to said selecting operation.

13. A game system, comprising:

a display surface;

a saver configured to store a state of a game during execution as execution state information in a memory, and to store a captured image of a game screen by bringing it into correspondence with said execution state information in said memory at a time;

a captured image configured to display the captured image stored by said saver on a display surface with the game screen displayed on said display surface, during execution of the game;

a selecting operation acceptor configured to accept a selecting operation from a user in a state that the game screen and the captured image are displayed by said captured image displayer; and a state restorer configured to restore a state of the game by using the execution state information which is brought into correspondence with the captured image selected in response to said selecting operation.

14. An apparatus comprising:

a computer processing system, comprising a computer processor, configured to:

store, in a non-transitory computer-readable storage medium, a captured image of a game screen of a game and execution state information corresponding to the captured image, the captured image having been displayed before a current game image;

simultaneously display both the current game image and the captured image;

receive user input while both the current game image and the captured image are being simultaneously displayed; and restore, in response to the received user input, a state of the game based on the execution state information corresponding to the captured image.

* * * * *